Patented Nov. 14, 1939

2,180,000

UNITED STATES PATENT OFFICE 2,180,000

DENATURED ALCOHOL CONTAINING A LOWER ALKYL ACETAL

Louis J. Figg, Jr., and James Wendell Rhea, Kingsport, Tenn., assignors to Eastman Kodak Company, Rochester, N. Y., a corporation of New Jersey No Drawing. Application October 23, 1937, Serial No. 170,663

3 Claims. (Cl. 202—77)

This invention relates to the denaturing of ethyl alcohol, and to alcohol so denatured.

It is an object of our invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

We have discovered that a lower alkyl acetal selected from the group consisting of acetal and dimethyl acetal is an effective denaturant for ethyl alcohol. In denaturing ethyl alcohol with our novel denaturants, we may use from 0.5 to 5 parts of the lower alkyl acetal, or even more, per 100 parts of 95% alcohol.

Our novel denaturants may be used alone in denaturing, or they may be used in conjunction with denaturing materials derived from the destructive distillation of hardwood, such as those which are described in United States Patents 1,975,090, 1,975,091, and 1,975,092. While we may use a mechanical mixture of the lower alkyl acetal with the hardwood denaturants, we prefer to introduce the lower alkyl acetal, along with the hardwood denaturant oils, into the upper portions of a bubble-cup fractionating column, where they are met by the ascending vapors of ethyl alcohol or of a mixture of ethyl alcohol and denaturing grade isopropanol, in the manner which is fully set forth in Patent 1,975,091. The proportions in which the lower alkyl acetal may be used may vary widely. Our novel denaturants may also be used in conjunction with ethers, or with any other denaturants with which they may be found to be compatible.

As illustrative examples, we may use, for denaturing, compositions such as the following:

*Example I*

| | Per cent by volume |
|---|---|
| Light acid and washed alcohol oils | 4 |
| Allyl alcohol fraction | 3 |
| Dimethyl acetal | 89 |
| Isopropyl alcohol | 4 |

*Example II*

| | Per cent by volume |
|---|---|
| Light acid and washed alcohol oils | 4.00 |
| Allyl alcohol fraction | 3.00 |
| Isopropyl alcohol | 4.25 |
| Water | 1.50 |
| Di-isopropyl ether | 10.00 |
| Acetal | 77.50 |

*Example III*

| | Per cent by volume |
|---|---|
| Isopropyl alcohol | 15 |
| Di-isopropyl ether | 10 |
| Acetal | 75 |

The light acid and washed alcohol oils and the allyl alcohol fraction referred to are described in United States Patent 1,975,091. From 0.5 to 5 parts, or even more, of such combinations as those described above may be used per 100 parts of 95% alcohol.

What we claim as our invention and desire to be secured by Letters Patent of the United States is:

1. Industrial ethyl alcohol denatured with 0.5 to 5 parts of a lower alkyl acetal selected from the group consisting of acetal and dimethyl acetal, as an essential denaturing element, per 100 parts of 95% ethyl alcohol.

2. Industrial ethyl alcohol denatured with 0.5 to 5 parts of acetal, as an essential denaturing element, per 100 parts of 95% ethyl alcohol.

3. Industrial ethyl alcohol denatured with 0.5 to 5 parts of dimethyl acetal, as an essential denaturing element per 100 parts of 95% ethyl alcohol.

LOUIS J. FIGG, Jr.
JAMES WENDELL RHEA.